United States Patent
Adamic et al.

(10) Patent No.: US 8,930,400 B2
(45) Date of Patent: Jan. 6, 2015

(54) SYSTEM AND METHOD FOR DISCOVERING KNOWLEDGE COMMUNITIES

(75) Inventors: Lada Adamic, Palo Alto, CA (US); Bernardo Huberman, Palo Alto, CA (US)

(73) Assignee: Hewlett-Packard Development Company, L. P., Houston, TX (US)

(*) Notice: Subject to any disclaimer, the term of this patent is extended or adjusted under 35 U.S.C. 154(b) by 3081 days.

(21) Appl. No.: 10/994,834

(22) Filed: Nov. 22, 2004

(65) Prior Publication Data

US 2006/0112105 A1    May 25, 2006

(51) Int. Cl.
*G06F 7/00* (2006.01)
*G06F 17/30* (2006.01)

(52) U.S. Cl.
CPC .... *G06F 17/30613* (2013.01); *G06F 17/30699* (2013.01); *Y10S 707/99939* (2013.01)
USPC ........... 707/781; 707/706; 707/736; 707/758; 707/999.009

(58) Field of Classification Search
CPC ................... G06F 17/30864; G06F 17/30011; G06F 17/30165
See application file for complete search history.

(56) References Cited

U.S. PATENT DOCUMENTS

| | | | |
|---|---|---|---|
| 4,591,980 A | 5/1986 | Huberman et al. | |
| 4,835,680 A | 5/1989 | Hogg et al. | |
| 4,835,732 A | 5/1989 | Huberman et al. | |
| 5,526,477 A | 6/1996 | McConnell et al. | |
| 5,732,192 A * | 3/1998 | Malin et al. | 703/2 |
| 5,826,244 A | 10/1998 | Huberman et al. | |
| 6,027,112 A | 2/2000 | Guenther et al. | |
| 6,078,906 A | 6/2000 | Huberman et al. | |
| 6,085,216 A | 7/2000 | Huberman et al. | |
| 6,115,718 A | 9/2000 | Huberman et al. | |
| 6,119,052 A | 9/2000 | Guenther et al. | |
| 6,272,507 B1 | 8/2001 | Pirolli et al. | |
| 6,308,175 B1 * | 10/2001 | Lang et al. | 707/10 |
| 6,400,372 B1 | 6/2002 | Gossweiler et al. | |
| 6,415,368 B1 | 7/2002 | Glance et al. | |
| 6,441,817 B1 | 8/2002 | Gossweiler et al. | |
| 6,470,269 B1 | 10/2002 | Adar et al. | |
| 6,631,451 B2 | 10/2003 | Glance et al. | |
| 6,647,383 B1 * | 11/2003 | August et al. | 707/3 |
| 6,675,170 B1 * | 1/2004 | Flake | 707/101 |

(Continued)

OTHER PUBLICATIONS

Warren et al, Web-Based methods for identifying, presenting, rating and presenting rating of customer reviews of products, Nov. 19, 1999, pp. 1-26.*

(Continued)

*Primary Examiner* — Hosain Alam
*Assistant Examiner* — Azam Cheema
(74) *Attorney, Agent, or Firm* — Law Office of Phillip S. Lyren

(57) ABSTRACT

Embodiments of the present invention relate to a system and method for discovering knowledge communities. Embodiments of the present invention may comprise providing user access to a network of documents, gathering document access data relating to user access of each document in the network of documents and document authorship and review data, and establishing relationships between users and documents based on the document access data and document authorship and review data. Further, embodiments of the present invention may comprise establishing a network of users that are linked by common document access patterns based on the relationships between users and documents, and clustering communities of users within the network.

13 Claims, 7 Drawing Sheets

(56) References Cited

U.S. PATENT DOCUMENTS

| | | | |
|---|---|---|---|
| 7,107,518 B2* | 9/2006 | Ramaley et al. | 715/235 |
| 7,111,008 B2* | 9/2006 | Nomura et al. | 707/101 |
| 7,158,971 B1* | 1/2007 | Bascom | 707/10 |
| 7,263,655 B1* | 8/2007 | Carden, Jr. | 715/234 |
| 7,421,504 B2* | 9/2008 | Imaida et al. | 709/229 |
| 2002/0073009 A1 | 6/2002 | Hogg et al. | |
| 2002/0147739 A1* | 10/2002 | Clements et al. | 707/500 |
| 2002/0147895 A1 | 10/2002 | Glance et al. | |
| 2003/0074166 A1 | 4/2003 | Jackson et al. | |
| 2003/0187739 A1* | 10/2003 | Powers | 705/14 |
| 2005/0038533 A1* | 2/2005 | Farrell et al. | 700/73 |

OTHER PUBLICATIONS

Eytan Adar et al., Zoomgraph, date unknown.

Joshua R. Tyler et al., Email as Spectroscopy: Automated Discovery of Community Structure within Organizations, 2002.

Michelle Girvan et al., Community Structure in Social and Biological Networks, Dec. 7, 2001.

Fang Wu et al., Finding Communities in Linear Time: A Physics Approach, 2003.

Nina Mishra, A New Conceptual Clustering Framework, May 25, 2004.

Vladimir Batagelj et al., Pajek—Program for Large Network Analysis, May 28, 1997/Jan. 3, 1999.

Jurgen Symanzik et al., Software Integration for Multivariate Exploratory Spatial Data Analysis, 2002.

Lada A. Adamic et al., A Tool for Discovering Knowledge Communities, date unknown.

\* cited by examiner

SYSTEM AND METHOD FOR DISCOVERING KNOWLEDGE COMMUNITIES

BACKGROUND

Large communities of individuals (e.g., large business enterprises) often cumulatively comprise a large amount of of knowledge relevant to a given topic. However, members of such communities do not always recognize what is known within their respective communities as a whole. Therefore, it may be desirable to facilitate the sharing of expertise, information, and available data in such communities to increase communal awareness and mutual knowledge. This sharing may be referred to as knowledge sharing. Knowledge sharing may include assembling and sharing the collective expertise of a community to facilitate innovation, efficiency, productivity, and so forth. The collective expertise assembled through knowledge sharing may be very valuable because it is typically up-to-date, very extensive, and presented in an appropriate context.

Today's large enterprises in both the public and private sectors often find it desirable to encourage knowledge sharing, both among enterprise members (e.g., employees) and globally, to facilitate the implementation of increasingly difficult solutions. Traditional types of knowledge sharing methods include conferences, meetings, and even conversations around the office coffee machine. What are needed are improved capabilities for capturing knowledge where it exists and converting it into a usable form.

SUMMARY

Embodiments of the present invention relate to a system and method for discovering knowledge communities. One embodiment includes providing user access to a network of documents, gathering document access data relating to user access documents in the network of documents and document authorship and review data, and establishing relationships between users and documents.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
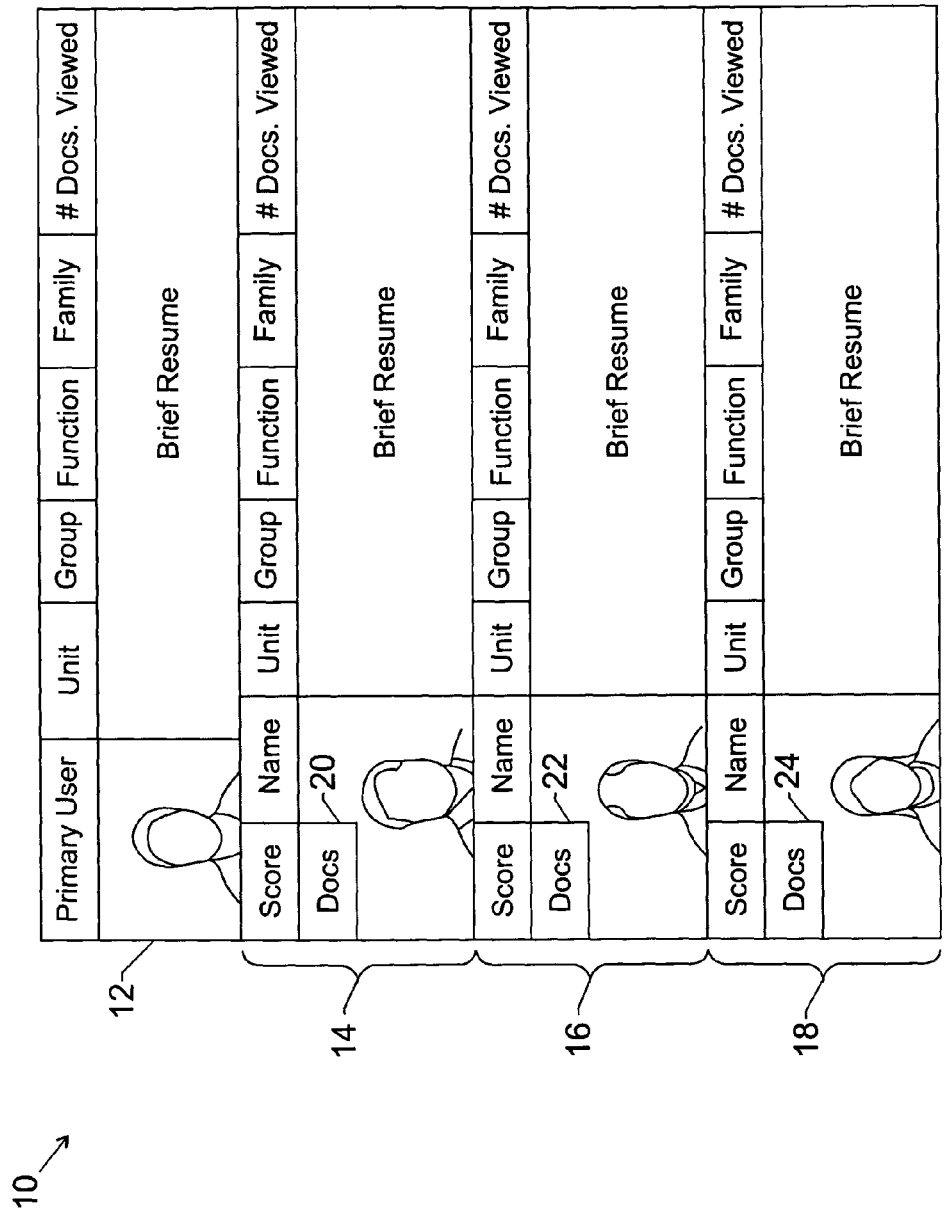
FIG. 1 illustrates an exemplary data screen produced in accordance with embodiments of the present invention.

FIG. 1 illustrates an exemplary data screen produced in accordance with embodiments of the present invention. The illustrated screen may be generally referred to by reference numeral 10. Screen 10 may be the product of an interactive tool in accordance with embodiments of the present invention that allows end users to find other users with similar interests and documents relevant to such interests. Such a tool may first discern a community of users with common interests (i.e., a knowledge community) and then provide links to documents written, reviewed, downloaded, and so forth by those in the community. For example, in screen 10 a primary user (frame 12) is matched with a community of users who have read some of the same documents as the primary user. Specifically, frames 14, 16, and 18 of screen 10 each comprise information (e.g., names and a brief resume) relating to individual community members that are associated with the primary user (frame 12) through certain documents. This information may facilitate collaboration between the primary user and those in the knowledge community. Further, screen 10 comprises links 20, 22, and 24, which may provide access to documents written, reviewed, and so forth by individual members of the knowledge community, thus facilitating research and other forms of knowledge sharing.

As reflected by embodiments of the present invention, it has now been recognized that knowledge sharing can be fostered by facilitating and analyzing explicit sharing and accessing of documents (e.g., technical papers). Indeed, embodiments of the present invention are directed to increasing the value of such documents by using document related data (e.g., document access information) and information within the documents themselves to assist individuals in finding relevant and current information. By analyzing document access patterns in accordance with embodiments of the present invention, not only can clusters of related documents be found, but also communities of users can be found whose interests correspond to such clusters. Once these relationships and knowledge communities are discovered, embodiments of the present invention may facilitate a knowledge sharing culture, where community members (e.g., technologists) collaborate and share their expertise with their peers. For example, screen 10, which may be the result of a method of analysis in accordance with embodiments of the present invention, may facilitate knowledge sharing by providing information relating to members of a knowledge community along with links to related documents. One advantage of embodiments of the present invention over conventional solutions may be the ability to automatically discover knowledge communities using scalable and robust algorithms.

In accordance with embodiments of the present invention, community members may share information through documents published on a network (e.g., the Internet). For example, documents (e.g., knowledge briefs and technical papers) may be published on the Internet and used to disseminate information about technology, best practices, or project experience. The information provided by such documents can help with new business endeavors or make existing projects more efficient. Users of an interactive tool (e.g., an online portal) in accordance with embodiments of the present invention may be able to browse documents by focus area or keyword, rate the documents, and comment on them. Additionally, in accordance with embodiments of the present invention, useful information hidden in usage access patterns may be explicitly available to the users. This newly available information may facilitate further knowledge sharing. For example, in accordance with embodiments of the present invention, users may be made aware of others searching for the same information. Indeed, users may even be made aware of whole communities of users addressing similar problems.

Several benefits may arise from being made aware of knowledge communities and recognizing when different users access the same document in accordance with embodiments of the present invention. For example, heightened community awareness may facilitate collaboration between community members and result in better and more efficient research and problem solving. Users may research more efficiently by utilizing a tool in accordance with embodiments of the present invention that deems certain documents more authoritative or relevant based on the number of times they are accessed. For example, a particular technical paper having been accessed by a large portion of a knowledge community may be deemed extremely relevant to that particular knowledge communities' field of interest in accordance with embodiments of the present invention.

It should also be noted that user access patterns can be indicative of when a document has declined in value as a reference in accordance with embodiments of the present invention. In a rapidly changing technological environment most documents eventually reach the end of their usefulness. Embodiments of the present invention may be adapted to not only recognize when a document has ceased to be of interest, but also to predict how quickly the document will lose relevance. Further, just as it is useful to know when different users access the same document, knowing which documents are accessed by the same users can help suggest related documents for research. For example, a researcher in a particular knowledge community can benefit from the research of others in the community by reviewing a list of documents the others have accessed, written, and so forth.

Screen 10 may be the result of an online portal service (e.g., a document navigator) in accordance with embodiments of the present invention. An online portal may include a network site (e.g., Web site) that serves as a gateway to a network (e.g., the Internet) including a collection of links to network services. For example, a portal in accordance with embodiments of the present invention may provide services such as document searching, document navigation, community news, reference tools, and communications capabilities (e.g., e-mail and chat rooms). An online portal or other interactive tool in accordance with embodiments of the present invention may be configured to facilitate a user's search for documents relating to a particular area of interest and to find other individuals with similar interests. For example, when a user views a particular document, the user may be presented with a list of related documents, where the relationship to the other documents is derived from document access patterns (e.g., users that accessed document A also accessed document B).

As discussed above, screen 10 may represent results obtained in accordance with embodiments of the present invention, in which a user is matched with others who have read some of the same documents as the user. This is particularly beneficial for facilitating knowledge sharing because the users are matched as a result of accessing the same document or documents, not merely on a claim of similar interests. This provides context for collaboration and avoids the inefficiency of associating people that merely share an interest in a broad topic area. Specifically, for example, screen 10 may comprise results from a document navigator in accordance with embodiments of the present invention, where a user interested in solutions for a particular software package is matched with similar users. Information regarding related documents and users (e.g., the information displayed in screen 10) may be provided by first obtaining analysis results based on document access patterns and content, integrating the results into the portal, then using portal services in accordance with embodiments of the present invention (e.g., search and analysis tools) to provide relationships between documents and individuals.

Additionally, embodiments of the present invention may provide sophisticated visualization and analysis tools adapted to give both detailed and global views of user and document knowledge communities. Embodiments of the present invention may comprise a visualization interface that has a more relevant set of useful features to knowledge management applications than conventional packages. Indeed, embodiments of the present invention may comprise a visualization tool that allows for both interactive visualization and extensive network analysis through an interface to a statistical package, such as the statistical package R (statistical package R is a language and environment for statistical computing and graphics). For example, visualization and analysis tools in accordance with Eytan Adar and Joshua R. Tyler, *Zoomgraph*, http://www.hpl.hp.com/shl/projects/graphs/, which is incorporated herein by reference, may be utilized along with a statistical program (e.g., R) in accordance with embodiments of the present invention to provide data accessibility and visualization of user and document data clusters. Simple listings of documents, links, people, and so forth, as provided in screen 10, may be adequate for end users. However, administrators of a system in accordance with embodiments of the present invention may require a powerful tool that reveals which users across the world could benefit from each other's acquaintance and what documents are complementary.

Visualization can be complemented in accordance with embodiments of the present invention with algorithmic techniques that are adapted to identify clusters of related documents or users. For example, one algorithm that may be utilized in accordance with embodiments of the present invention is described in U.S. patent application Ser. No. 10/859578 entitled A System and Method for Discovering Communities in Networks by Bernardo Huberman et al. ("Huberman et al."), which is incorporated herein by reference. The Huberman et al. application discloses an algorithm that can partition a network into clusters in times that are linearly proportional to the number of users. The algorithm may be adapted to either partition the whole network or quickly discover just the community around a particular user. These features may be an important factor for a system with thousands of users, such as an online portal in accordance with embodiments of the present invention.

Figure 2:
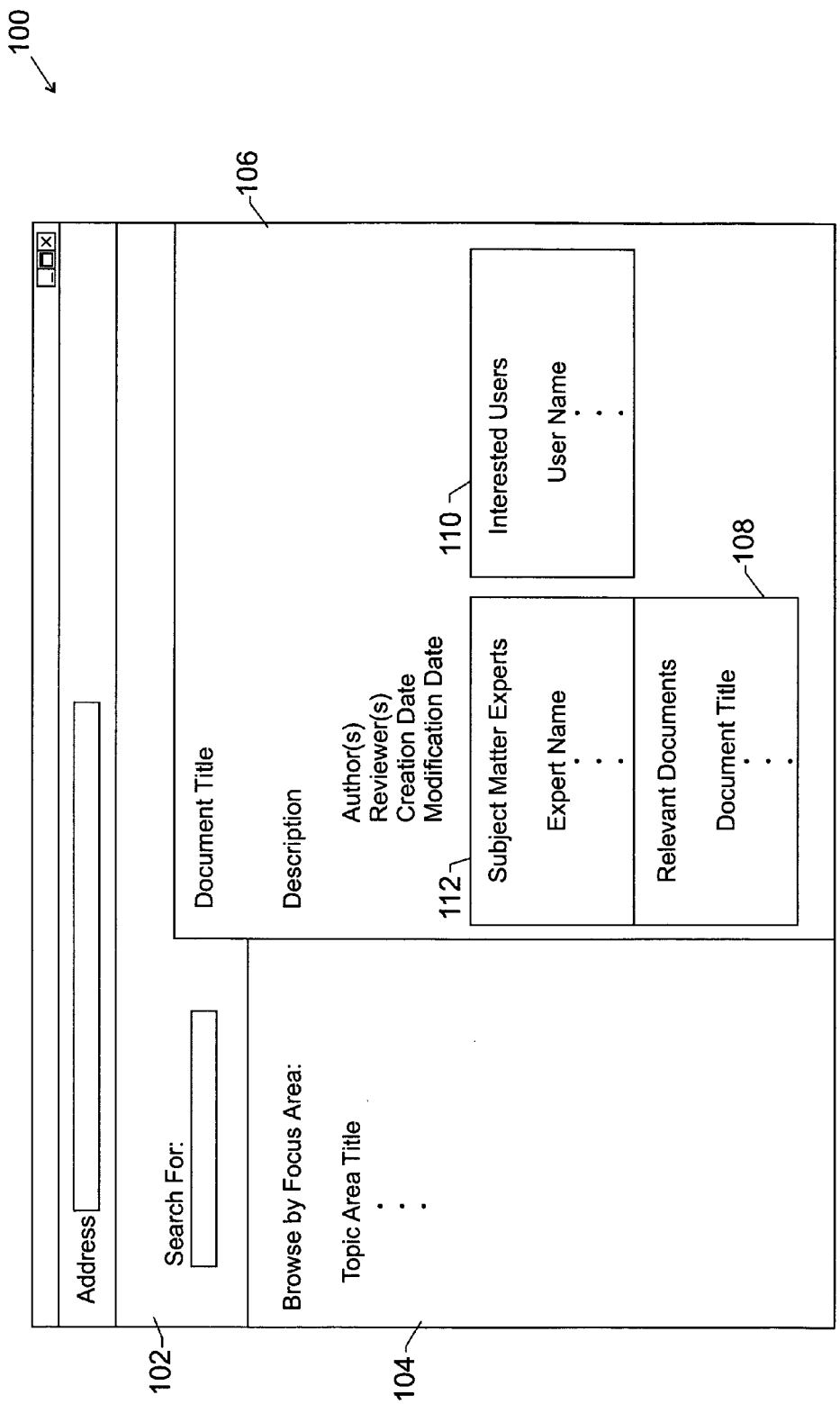
FIG. 2 illustrates an exemplary data screen viewed through an online portal in accordance with embodiments of the present invention.

FIG. 2 illustrates an exemplary data screen viewed through an online portal in accordance with embodiments of the present invention. The data screen may be referred to generally by reference numeral 100. Specifically, screen 100 may comprise various different interactive pages of a navigation tool in accordance with embodiments of the present invention, such as a search page 102, a category focus area page 104, and a document details page 106. The search page 102 may be adapted to allow a user to request electronic retrieval of documents based on the presence of specific terms and within other established restrictions (e.g., subject, date). The focus area page 104 may allow a user to browse available documents by topic area and select documents of interest in accordance with embodiments of the present invention. For example, a user may choose a topic area entitled "architecture" and then browse a listing of available architecture related documents that may subsequently be selected for viewing or downloading.

Although documents may be grouped by focus area in accordance with embodiments of the present invention, some focus areas may contain hundreds of documents, making it difficult to judge which ones in particular are most related to a document currently being viewed. Accordingly, to assist in finding related information, a list of related documents may be added to the details page 106 displayed for each selected document. The document details page 106 may provide a user with a list of relevant information based on a user's selection of a particular document in accordance with embodiments of the present invention. For example, based on a user's document selection, the document details page 106 may provide a list of related documents 108, a list of other users interested in the document's topic 110, a list of experts in the subject area of the document 112, and so forth. These lists may be linked to actual pages on a network to facilitate exploration of a space of related documents including viewing, downloading, and so forth.

Additionally, scores representing relative values for each related document (e.g., the scores illustrated in frames 14, 16 and 18 of FIG. 1) may be provided in accordance with embodiments of the present invention to assist users in discerning which documents in a set of related documents are more relevant. Weighting factors may be used to provide scores, wherein weight changes between documents are based on the number of times the documents are visited by particular users. For example, the weight may increase each time a user visits a particular document. However, merely counting visits may not be sufficient. It may be desirable to give more weight to users who are selective in their download patterns. For example, if two documents are downloaded by the same user, but that user has also downloaded nearly every other document in the collection, the chance of those two documents in particular being similar may be low and such a user may be deemed less discriminating. Alternatively, if a user downloads only a few documents and of those few, two documents happen to be the two documents currently under consideration, it may be likely that the other documents deal with a similar topic (one of interest to a primary user). Accordingly, weighting may be assigned to give less importance to less discriminating users and vice versa.

These scores and weights may be computed using a simple cosine similarity metric. Each document may be represented by a vector, where each entry in the vector is a TFIDF (term frequency, inverse document frequency) weight assigned to each user who has downloaded the document. TFIDF weighting is standard in information retrieval tasks. Specifically, the weight ($w_{du}$) of user u for document d may be given by the following equation.

$$w_{du} = n_{du} * \text{Log}(D_T/D_u).$$

$D_T$ may be the number of documents in the collection and $D_u$ may be the total number of documents downloaded by user u. The term frequency component of the weight, $n_{du}$, may be defined as the number of times a user u has accessed a document d. It should be noted that to give less importance to less discriminating users the term frequency may be multiplied by the IDF (inverse document download frequency by user).

The cosine similarity measure may be applied by taking the dot product of the vectors for two documents and dividing by their norms, $s(v,w)=v \cdot w/(\|v\| \cdot \|w\|)$. Accordingly, if the two documents were accessed by the same users, the exact same number of times, their cosine similarity would be 1. However, if no single user accessed both documents, their similarity score would be 0. The most similar documents to the one the user is currently viewing may then be displayed for the user in accordance with embodiments of the present invention. In this way, the user is made aware of relevant documents, even if those documents may reside in different categories or have textually different titles.

As discussed above, by analyzing document access patterns in accordance with embodiments of the present invention, not only can clusters of related documents be found, but also communities of users can be found whose interests correspond to such clusters. By discerning and providing access to these knowledge communities, embodiments of the present invention may let users know who else is exploring the same space. Accordingly, embodiments of the present invention may encourage user awareness of the scope and extent of interest in a particular topic. Further, it may be that two individuals who regularly collaborate utilizing embodiments of the present invention will find that they have another interest in common. Similarly, two people across an organization, who have never met, may find someone new to share their questions and experiences with by utilizing embodiments of the present invention. It should be noted that the end users of embodiments of the present invention are not necessarily told precisely which documents others have read, but rather only what clusters of related documents they have explored. This may alleviate privacy concerns among users. However, it should be noted that in alternative embodiments where certain privacy issues are not problematic, users may have access to documents they have in common with other users.

To find a user community for a document cluster C in accordance with embodiments of the present invention, a weight may be assigned to each document in cluster C (including the document for which the cluster was generated) based on factors relating to access patterns. For example, each weight may incorporate a user factor (e.g., a factor based on a user's level of discrimination) and a recency factor (e.g., a factor based on how recently the user downloaded the document). In some embodiments of the present invention, an exponential weighting for each visit may be incorporated, as illustrated in the following equation:

$$w(t)=\exp(-c \cdot t),$$

where w represents weight, c is a constant and t represents time. Setting c=−0.002 gives a visit a month ago 86% of the weight of a visit today, and a year old visit 16% of the weight of a visit today. This weighting may keep user communities fresh in accordance with embodiments of the present invention by downweighting users who have not taken an interest in the topic for a substantial period of time.

For a user u accessing a document d at times $t_1, t_2, \ldots, t_n$, the weight $w_{du}$ may be given by the following equation in accordance with embodiments of the present invention:

$$w_{du} = \sum_{i=1}^{n} w(t_i).$$

Further, the user may be assigned a score for the cluster around document d that is given by the following equation:

$$s_u = \sum_{d \in C} s_d w_{du} \log\left(\frac{D_T}{D_u}\right),$$

where $s_u$ represents the score of the user, $s_d$ represents the score of the document, $D_T$ represents the total number of documents in the collection, and $D_u$ represents the number of documents accessed by the user. Hence user scores may depend on how many documents each user downloaded from the cluster, how similar those documents were to the main document, how recent the downloads were, and so forth in accordance with embodiments of the present invention. Again the IDF measure may be used to downweight users who access a large fraction of the documents. Otherwise, such users may show up as being interested in all possible topics. It should be noted that some of the users who download a large fraction of documents are administrators of the system who need to download the documents for testing and updating.

Embodiments of the present invention may prevent spurious results by providing user configurable thresholds when defining data clusters. As discussed above, user communities and related documents may be discovered in accordance with embodiments of the present invention based on document data clusters. However, sometimes a document will not be a member of a particularly cohesive cluster. This will be reflected in low similarity scores for the documents in the cluster, as well as low scores for the users for the cluster, since those incorporate document similarities as well. One can introduce similarity thresholds to eliminate such spurious results. For example, if a document is assigned a score beneath a low-level threshold value set by a user, it may be excluded from further analysis. Additionally, certain users may be excluded by a threshold that excludes users with an administrator status.

In addition to identifying related documents and knowledge communities, embodiments of the present invention may assist users is finding experts in fields relating to discovered data clusters or document clusters. For example, documents, such as knowledge briefs and technical papers, frequently present solutions to particular tasks or problems. Embodiments of the present invention may allow a user to discover the experts that solved the problems and went on to write about them in such documents. In accordance with embodiments of the present invention, experts for each document cluster may be obtained by assigning expert scores to authors, reviewers, and readers of the documents. Additionally, the popularity of the documents and the similarity of such documents to the main document may be factored into the expert scores. The popularity of the document, $p_d$, may simply be the sum of the recency-weighted downloads:

$$p_d = \sum_i w(t_i).$$

These expert scores may have adjusted values that emphasize authoring, reviewing, and reading. For example, a weight $\alpha$ may be assigned to authoring a document, a weight $\beta$ to reviewing the document, and a weight $\gamma$ to downloading the document. The score for each user who authored at least one document in a cluster of documents may be composed as follows: for each document d in the cluster that a particular user authored, reviewed or downloaded, $(\alpha \text{ or } \beta \text{ or } \gamma) * p_d * s_d$ may be added to their score. Accordingly, experts may be determined to be the users who wrote, reviewed, and read the greatest number of popular and relevant documents in the cluster.

While various weighting allocations may be utilized in accordance with embodiments of the present invention, authoring is typically assigned higher weight than reviewing and reading in order to facilitate the discovery of experts. Accordingly, an author may have to review and read several documents to receive a score equal to authoring a document in accordance with embodiments of the present invention. Authors are typically considered the most important expert because they have published the material and contributed to the community in a very obvious manner. Therefore, authors are given the highest weighting in accordance with embodiments of the present invention. Reviewers may play an important role in ensuring the accuracy of information in a document and they may well be an expert in an area, but they have not contributed in the same way as the author. Accordingly, reviewers may be given a weighting that is one fifth of an author's weighting in accordance with embodiments of the present invention. Readers are knowledge consumers rather than knowledge contributors. While readers may have expertise in the area, they may merely be trying to learn. However, they play a role by taking the knowledge and using it in their projects and other commitments. Accordingly, a reader's potential to be an expert may be recognized with a weighting of one-twentieth of an author's weighting in accordance with embodiments of the present invention. It should be noted that the specific weighting ratios provided above are merely reflective of one embodiment in accordance with the present invention. In other embodiments in accordance with the present invention, different weighting ratios and even weighting relationships may be utilized.

Figure 3:
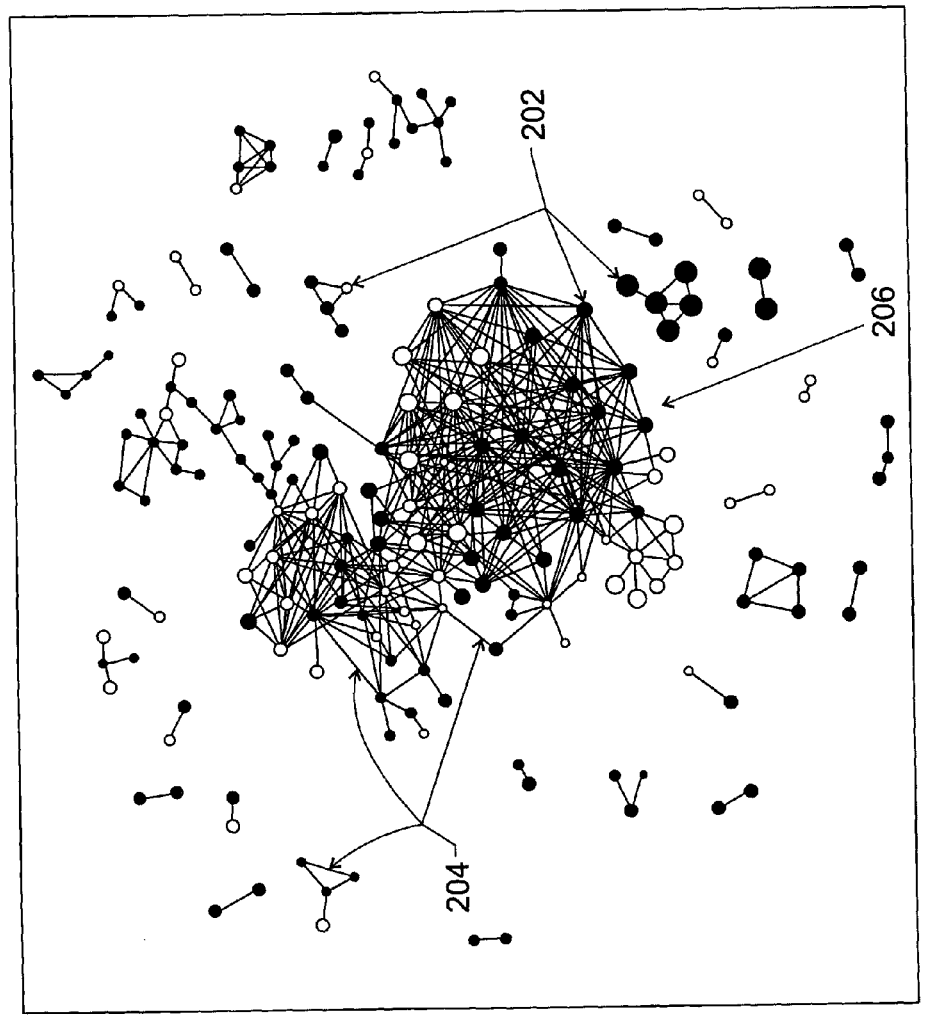
FIG. 3 is a graph representing a user community layout produced by an analysis and visualization tool in accordance with embodiments of the present invention.

FIG. 3 is a graph representing a user community layout produced by an analysis and visualization tool in accordance with embodiments of the present invention. The graph may be generally referred to by reference numeral 200. Specifically, graph 200 may be produced by a network visualization and analysis tool in accordance with embodiments of the present invention. A network consists of a group of nodes 202 and edges 204. Each node in graph 200 may represent a user and each edge between the nodes may represent a similarity between the connected nodes. Each node and edge may posses an arbitrary number of attributes. In accordance with some embodiments of the present invention, shapes, colors, patterns, and so forth may be utilized to represent certain attributes relating to the illustrated data. For example, in one embodiment of the present invention each node may be colored to correspond to the represented user's business unit within a larger organization or to represent the number of documents each user has accessed. Further, edges may only be displayed for users whose similarity is above a fixed threshold or the color of edges may depend on the strength of similarity between nodes. If FIG. 3 represents multiple business units in an organization, it may be apparent in accordance with embodiments of the present invention that users across the organization share interests based on the clustering of nodes (e.g., cluster 206). Accordingly, it may be beneficial for these users to be made aware of one another in accordance with embodiments of the present invention.

Figure 4:
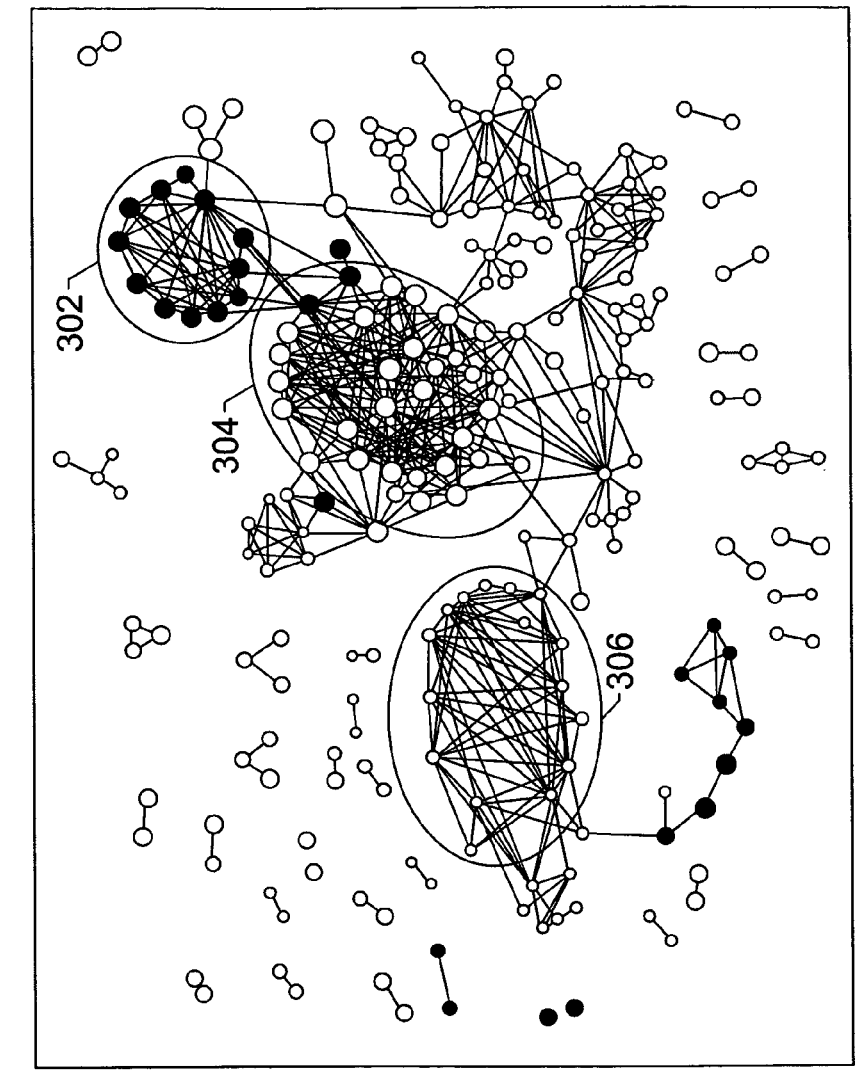
FIG. 4 is a graph representing related documents produced by a visualization tool in accordance with embodiments of the present invention.

FIG. 4 is a graph representing related documents produced by a visualization tool in accordance with embodiments of the present invention. Visualization tools in accordance with embodiments of the present invention may comprise computer software adapted for use on a standard computing platform. Further, visualization tools in accordance with embodiments of the present invention may have an interactive, zoomable interface such that users can freely zoom in and pan around a graph by providing input (e.g., dragging a mouse). This may be useful when visualizing large networks whose structures are hard to discern in a global view. For example, by mousing over a node or edge, a user may be able to see related properties in an information window. Additionally, users may have at their disposal several layout algorithms, as well as an option of manually positioning the nodes.

In accordance with embodiments of the present invention, users may continuously update a view by typing a few simple queries, for example, asking all nodes of a certain property to change color. FIG. 4 may illustrate the results of a few such queries in graph 300. The nodes in graph 300 may represent documents with connections placed between documents that are related by access patterns. Specifically, in graph 300, two document focus areas are highlighted, a first focus area is represented by black nodes and a second focus area is represented by white nodes. It is illustrative to see that both sets of documents are subdivided into smaller clusters (e.g., 302, 304, 306), thus providing information that may be useful in organizing the documents into subcategories. Embodiments of the present invention may also comprise a morphing feature that provides a visually smooth transition between different states of a network. These may reveal how a network evolves over time. For example, a shift in interest based on accesses to the document collection, or a merging of interest between two previously unrelated topics may be illustrated. In some embodiments of the present invention, the changing displays discussed above can be recorded as an MPEG movie to be played back.

In addition to posing challenges in visualization, large networks can also be time consuming to cluster. As discussed above, embodiments of the present invention may facilitate the discovery of document clusters that are, in effect, groups of documents that are related to one document in particular. When doing a global analysis in accordance with embodiments of the present invention, it may be desirable to discover groups of documents that are all similar to one another, but fairly different from other documents. Various existing techniques have been developed for clustering small networks, but they typically require $O(n^3)$ time, n being the number of nodes to compute the clusters. This can be prohibitively slow for networks of tens or hundreds of thousands of nodes.

Figure 5:
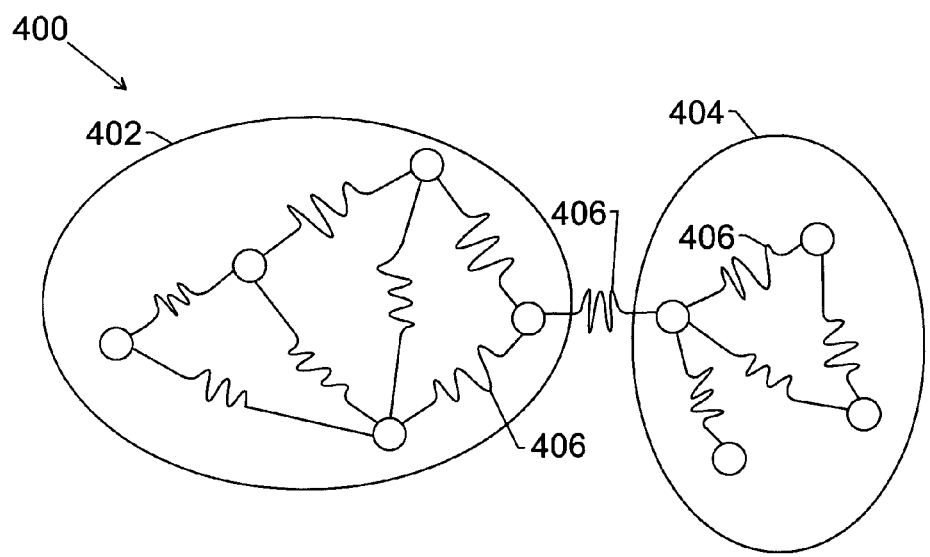
FIG. 5 is a schematic representation of a linear time voltage clustering algorithm in accordance with embodiments of the present invention.

FIG. 5 is a schematic representation of a linear time voltage clustering algorithm in accordance with embodiments of the present invention. The schematic may be generally referred to by reference number 400. Specifically, schematic 400 represents an algorithm wherein densely interconnected communities (e.g., 402, 404) are identified by measuring a theoretical voltage drop across theoretical resistors 406. Nodes with similar voltages may be identified as clusters (e.g., 402, 404) in accordance with embodiments of the present invention. Embodiments of the present invention may incorporate an O(n) (linear time) algorithm for finding clusters in large graphs, such as the algorithm disclosed in Huberman et al. The algorithm disclosed in Huberman et al. is a physics-inspired algorithm that treats each edge as a resistor. A theoretical voltage is applied at two random points in the resistor network in accordance with embodiments of the present invention, and solving Kirchkoff equations gives the voltage value at each node. By repeating this process a few times, and measuring the theoretical voltage drop across different connections in the network, embodiments of the present invention can separate out communities. Nodes that are densely connected and that therefore form a cohesive cluster may show only small voltage differences between them in accordance with embodiments of the present invention. Conversely, areas that are far apart and share relatively few connections may show large voltage differences in accordance with embodiments of the present invention. This approach can be used to find either user communities, by applying the algorithm to a network where similar users share an edge, or to find document clusters from a network of similar documents in accordance with embodiments of the present invention.

Figure 6:
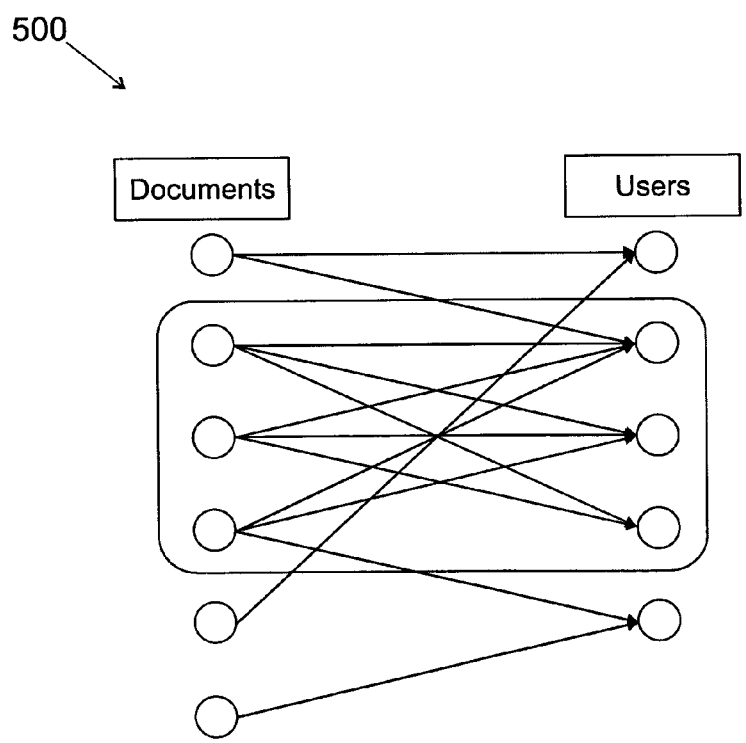
FIG. 6 is a bipartite graph illustrating connections between two distinct types of nodes in accordance with embodiments of the present invention.

FIG. 6 is a bipartite graph illustrating connections between two distinct types of nodes in accordance with embodiments of the present invention. The bipartite graph may be generally referred to by reference numeral 500. Specifically, bipartite graph 500 comprises nodes representing users and documents. Some clustering methods in accordance with embodiments of the present invention do not need to first identify similar users or similar documents to construct a network. Indeed, embodiments of the present invention may comprise methods of constructing networks that work directly with information relating to which users accessed certain documents. For example, the method described in Nina Mishra, Dana Ron and Ram Swaminathan, *Large Conjunctive Clusters and Bicliques*, MACHINE LEARNING JOURNAL, Kluwer Academic Publishers (Accepted 2004), which is incorporated herein by reference, comprises an algorithm to cluster large bipartite graphs, such as the graph 500. This algorithm may be utilized in accordance with embodiments of the present invention to identify bicliques or subsets of users who have all accessed nearly every document in a subset of documents. Further, this algorithm may return both the users and documents as a single community at once in accordance with embodiments of the present invention. This algorithm may produce many overlapping clusters. Some of the clusters will be unbalanced, having either very few users and a large number of documents, or a large number of users but very few documents. A user in accordance with embodiments of the present invention may select only the balanced clusters (e.g., several users accessing several of the same documents) from the numerous clusters the algorithm finds.

Figure 7:
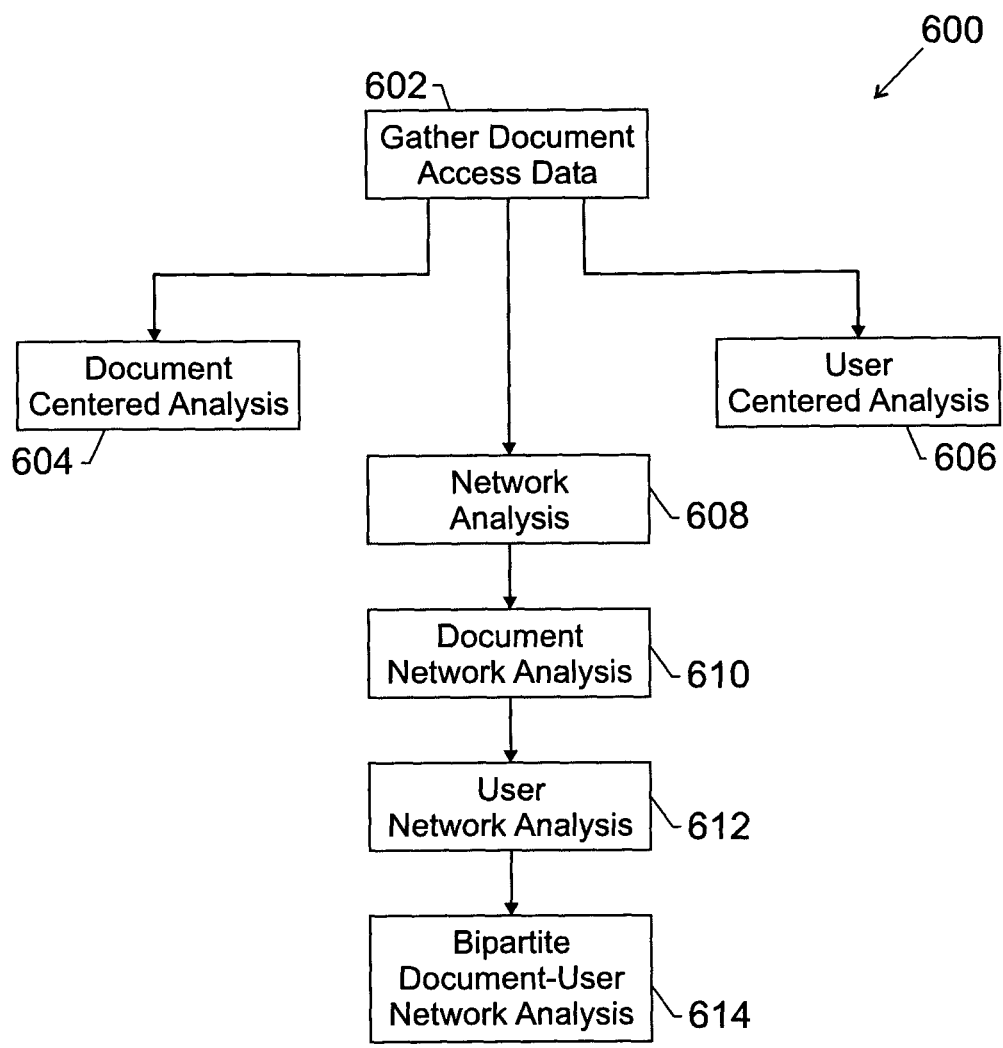
FIG. 7 is a process flow diagram that represents a method in accordance with embodiments of the present invention.

FIG. 7 is a flow chart that represents a method in accordance with embodiments of the present invention. The method may generally be referred to by reference numeral 600. Specifically, method 600 comprises four main components in accordance with embodiments of the present invention. Block 602 represents gathering document access data. Block 604 represents document centered analysis. Block 606 represents user centered analysis. Block 608 represents network analysis. Each of these components will be discussed in detail below. It should be noted that while FIG. 7 separately delineates specific method components, in other embodiments, individual components may be split into multiple components or combined into a single component.

Block 604 represents document centered analysis in accordance with embodiments of the present invention. Specifically, in block 604, a cluster of related documents, a cluster of users who access the documents, and a cluster of experts who are the authors and reviewers of the document may be generated for each document based on access patterns. Accordingly, when a regular end-user interfaces with a document (e.g., accesses a document) these clusters of related documents, users, and experts may be presented in accordance with embodiments of the present invention. Similarly, block 606 represents user centered analysis wherein a cluster of related users and a list of in-common documents (e.g., documents that the users have accessed in common) for each related user may be generated based on access patterns. Accordingly, in accordance with embodiments of the present invention, users may be presented with information relating to other users having similar interests and a list of documents reflecting those interests.

Block 608 represents network analysis in accordance with embodiments of the present invention. For example, block 608 may represent network analysis for the administrator of a document collection. Block 608 may comprise three method components: document network analysis (block 610), user network analysis (block 612), and bipartite document-user network analysis (block 614). In a document network (block 610), each node represents a document and a link is placed between two nodes in accordance with embodiments of the present invention if a threshold of similarity exists between the two. The document network may be explored with a visualization program (e.g., Zoomgraph) to get an overview of document access patterns, find new document categories, and break up or merged old document categories. Additionally in accordance with embodiments of the present invention, a time clustering algorithm can find clusters of related documents.

In a user network (block 612) in accordance with embodiments of the present invention, each node may represent a user and a link may be placed between two nodes if a threshold of similarity exists between the users. Such a user network may be explored in accordance with embodiments of the present invention with a visualization program (e.g., Zoomgraph) to see which groups of users share similar interests and then suggest collaborations between them. Additionally in accordance with embodiments of the present invention, a linear time clustering algorithm may find clusters of users with similar interests.

In a bipartite document-user network (block 614) in accordance with embodiments of the present invention, some of the nodes are representative of documents and some of users. A link may be placed between a user node and a document node if the represented user has accessed the represented document. Accordingly, a bipartite clustering algorithm in accordance with embodiments of the present invention may simultaneously find a group of users accessing a group of documents.

Figure 8:
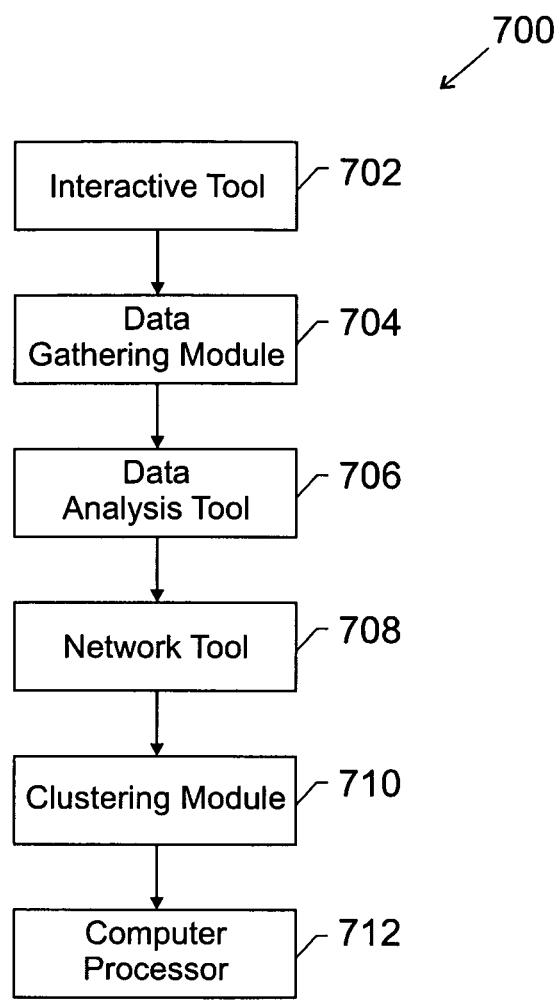
FIG. 8 is a block diagram illustrating a system in accordance with embodiments of the present invention.

FIG. 8 is a block diagram illustrating a system in accordance with embodiments of the present invention. The system may be generally referred to by reference numeral 700. The system 700 may incorporate various modules, as is illustrated by FIG. 8. While FIG. 8 separately delineates specific modules, in other embodiments, individual modules may be split into multiple modules or combined into a single module. Further, individual modules and components may comprise hardware, software or some combination thereof. In particular, the modules illustrated by FIG. 8 comprise: an interactive tool 702, a data gathering module 704, a data analysis tool 706, a network tool 708, a clustering module 710, and a computer processor 712. In accordance with embodiments of the present invention, the interactive tool 702 may be adapted to provide user access to a network of documents. The data gathering module 704 may be adapted to gather document access data relating to user access of each document in the network of documents. The data analysis tool 706 may be adapted to establish relationships between users and documents based on the document access data. The network tool 708 may be adapted to establish a network of users that are linked by common document access patterns based on the relationships between users and documents. The clustering module 710 may be adapted to cluster communities of users within the network.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A processor-based method for discovering knowledge communities, comprising:
   providing user access to a network of documents;
   gathering document access data that specifies users who accessed each document in the network of documents;
   gathering, for each document in the network of documents, document authorship data that specifies who authored a document and document review data that specifies who reviewed a document;
   identifying relationships between users and documents based on the document access data, the document authorship data, and the document review data;
   searching, per a search request, the relationships between users and documents to discover related documents; and
   displaying results of the search request that show information about a network of users that are linked by common document access patterns to the related documents in the network of documents.

2. The processor-based method of claim 1, comprising authenticating users of the interactive tool to establish user identification data.

3. The processor-based method of claim 1, comprising displaying the network of users to the user on a network visualization tool.

4. The processor-based method of claim 1, comprising establishing certain users as experts based on the document access data and document authorship and review data.

5. The processor-based method of claim 1, wherein gathering document authorship and review data comprises gathering user data for users that authored documents on the network of documents.

6. The processor-based method of claim 1, comprising scoring a user based on document access data and document authorship and review data for the user.

7. The processor-based method of claim 1, wherein gathering document access data comprises documenting a number of downloads of certain documents for a particular user.

8. The processor-based method of claim 1, wherein gathering document authorship and review data comprises documenting a number of authorships of certain documents for a particular user.

9. The processor-based method of claim 1, wherein gathering document authorship and review data comprises documenting a number of reviews of certain documents for a particular user.

10. The processor-based method of claim 1, comprising clustering the network of users with a linear time voltage clustering algorithm.

11. The processor-based method of claim 1, comprising clustering users communities based on access patterns and document authorship and review data for a particular user.

12. The processor-based method of claim 1, comprising clustering user communities based on access to a particular document.

13. The processor-based method of claim 1, comprising clustering communities of users within the network into at least one knowledge community.

* * * * *